United States Patent [19]

Nakai

[11] Patent Number: 4,760,600
[45] Date of Patent: Jul. 26, 1988

[54] CIPHER SYSTEM

[75] Inventor: Toshihisa Nakai, Tokyo, Japan

[73] Assignee: Oki Electric Industry Co., Ltd., Tokyo, Japan

[21] Appl. No.: 107,995

[22] Filed: Oct. 14, 1987

[30] Foreign Application Priority Data

Feb. 13, 1987 [JP] Japan .................................. 62-29885

[51] Int. Cl.[4] .............................................. H04L 9/00
[52] U.S. Cl. ........................................ 380/50; 380/44; 380/28
[58] Field of Search ...................... 380/44, 49, 50, 28

[56] References Cited

U.S. PATENT DOCUMENTS

| Re. 30,957 | 6/1982 | Feistel | 380/50 |
|---|---|---|---|
| 3,170,033 | 2/1965 | Vasseur | 380/50 |
| 3,784,743 | 1/1974 | Schroeder | 380/50 |
| 3,796,830 | 3/1974 | Smith | 380/49 |
| 3,798,360 | 3/1974 | Feistel | 380/49 |
| 3,911,216 | 10/1975 | Bartek et al. | 380/50 |
| 3,925,612 | 12/1975 | Guanella et al. | 380/50 |
| 4,172,213 | 10/1979 | Barnes et al. | 380/49 |
| 4,211,891 | 7/1980 | Glitz | 380/50 |
| 4,255,811 | 3/1981 | Adler | 380/49 |
| 4,375,579 | 3/1983 | Davida et al. | 380/28 |
| 4,447,672 | 5/1984 | Nakamura | 380/50 |
| 4,596,898 | 6/1986 | Pemmaraju | 380/49 |
| 4,663,500 | 5/1987 | Okamoto et al. | 380/50 |
| 4,668,103 | 5/1987 | Wilson | 380/44 |

OTHER PUBLICATIONS

Proc. of the 3rd Symposium on Information Theory and Its Application, Nov. 1980, pp. 371–377, Katsuhiro Nakamura, C & C Laboratories, Nippon Electric Co., Ltd.

Cryptography: A New Dimension in Computer Data Security; Stephen M. Matyas; John Wiley & Sons, pp. 88–100.

Primary Examiner—Salvatore Cangialosi
Assistant Examiner—Aaron J. Lewis
Attorney, Agent, or Firm—Spencer & Frank

[57] ABSTRACT

In a cipher system used in transmission or storage of digital data, the encipherment section comprises a first modulo-2 adder for adding, bit by bit, the k-bit contents of a first shift register storing latest k bits of ciphertext information and the k-bit contents of a first register. The k-bit output of the first modulo-2 adder is expanded into $m \times n$ bits, which are stored in a second register, and extracted in sequence, a set of n bits at a time. Each set of n bits is converted into a single bit. A second modulo-2 adder adds the 1 bit output to the contents of a third register, which stores the output of the second adder. A fifth register stores plaintext information input through the input terminal. A third modulo-2 adder adds the output of the second adder to the contents of a register storing plain text information to ciphertext information. A sixth register stores the output of the third adder. The contents of the sixth register are fed back to the first shift register, and are also output as ciphertext information.

4 Claims, 10 Drawing Sheets

| INPUT | OUTPUT |
|---|---|
| 0,0,0,0,0,0,0,0 | 1 |
| 0,0,0,0,0,0,0,1 | 0 |
| 0,0,0,0,0,0,1,0 | 0 |
| 0,0,0,0,0,0,1,1 | 1 |
| 0,0,0,0,0,1,0,0 | 1 |
| ⋮ | ⋮ |
| 1,1,1,1,1,1,1,0 | 1 |
| 1,1,1,1,1,1,1,1 | 0 |

FIG. 6

CIPHER SYSTEM

BACKGROUND OF THE INVENTION

The present invention relates to a cipher system used in transmission or storage of digital data for preserving secrecy on the transmission path or the storage media.

Examples of prior art cipher system are shown in proceedings of the 3rd Symposium on Information Theory and its Application, Nov. 1980, pp 371-377 "Some Consideration on a Simple Self-Synchronizing Encryption System" (this publication will be hereinafter referred to as Literature 1), and Cryptography: A New Dimension in Computer Data Security, by Stephen M. Matyas, published by John Wiley & Sons, New York, U.S.A., pp. 88-100 (this publication will be hereinafter referred to as Literature 2).

FIG. 9 is a block diagram showing an encryption system described in the Literature 2. In this system, 64-bit block cipher is used in a 1 bit CFB (Cipher Feed Back) mode. The left hand side of the figure is an encipherment section including an input terminal 901, a modulo-2 adder 902, a shift register 903, a 64 bit block encipherment unit 904, and a register 905. The right hand side of the figure is a decipherment section including a shift register 907, a 64-bit block encipherment unit 908, a register 909, a modulo-2 adder 910, and an output terminal 911. The encipherment section and the decipherment section are connected by a transmission path 906.

A bit series of plaintext is input through the input terminal 901 of the encipherment section, and is added at the adder 902 to the 1 bit at the left end of the register 905, to be enciphered. The enciphered bit series (ciphertext) is transmitted through the transmission path 906 to the decipherment section. The enciphered bit series is also fed back to the shift register 903, and stored in it for a predetermined time, or for a predetermined number of operation cycles, being shifted through the shift register 903. The 64-bit contents of the shift register 903 are input in parallel to the 64-bit block-encipherment unit 904 and converted into 64-bit data. The data output from the block-encipherment unit 904 are stored in a 64 bit register. Only the leftmost bit of the register 905 is applied to the modulo-2 adder 902 for encipherment.

The above operations are repeated, and the plaintext input through the input terminal 901 is enciphered bit by bit and transmitted through the transmission path to the decipherment section.

The ciphertext received at the decipherment section is stored in a shift register 907 for a predetermined time and is also sent to a modulo-2 adder 910, at which the ciphertext and the leftmost bit of the register 909 is added, by which decipherment is performed. The deciphered text is output through an output terminal 911. The shift register 907, the 64-bit block-encipherment unit 908, and the register 909 perform operations similar to those of the shift register 903, the 64-bit block-encipherment unit 904 and the register 905. Only if the encipherment key set in the 64-bit block-encipherment unit 904 and the decipherment key set in the 64-bit block-encipherment unit 908 are identical the contents of the registers in the encipherment section and the decipherment section coincide with each other. The information identical to the information input through the input terminal 901 is output through the output terminal 911.

FIG. 10 is a block diagram showing a cipher system disclosed in the Literature 1. In the illustrated system, instead of the 64-bit block-encipherment units, code converters (such as ROM) 924 and 928 storing code patterns corresponding to the respective encipherment keys are used. The system further include an input terminal 921, a modulo-2 adders 922 and 926, shift registers 923 and 927, a transmission path 925, and an output terminal 929.

The two systems described above have advantages that the correlation between the plaintext and the ciphertext can be made small, synchronization is automatically restored upon expiration of time proportional to the length of the shift register even after occurrence of a transmission path error or after synchronization being lost.

However, the 64-bit block-encipherment unit, e.g., DES used in the system of FIG. 9 is originally designed for encipherment of 64 bit data, i.e., conversion from 64 bits into another 64 bits. Only one bit of the result of the conversion is utilized. The 64-bit block-encipherment unit is complicated, and expensive if implemented by hardware, and slow (having low throughput) if implemented by software.

In the system of FIG. 10, the code converter having code patterns corresponding to the respective encipherment keys is required. When the number of the keys is increased or when the length of the shift register is increased, the system is not feasible. For instance, if the length of the shift register is 64, and the number of bits of the encipherment key is also 64, the required storage capacity is $2^{64} \times 2^{64} = 3.4 \times 10^{38}$.

SUMMARY OF THE INVENTION

An object of the invention is to solve the above-described problems of the prior art cipher system.

Another object of the invention is to provide a cipher system which can be implemented by a simple construction, without requiring code converters having code patterns corresponding to a number of encipherment keys.

According to the present invention, there is provided a cipher system comprising an encipherment section and a decipherment section, the encipherment section comprising:

a first shift register storing latest k bits of ciphertext information, a first register storing k bits of cipher key, a first modulo-2 adder means for adding, bit by bit, the k-bit contents of the first shift register and the k-bit contents of the first register, a first expander means for expanding the k-bit output of the first modulo-2 adder means into m×n bits, a second register for storing the m×n-bit output of the first expander means, a first controller means for performing control to extract the contents of the second register in sequence, a set of n bits at a time, a first code converter means receiving the output of the second register as extracted in turn by the first controller means, and converting each set of n bits into a single bit, a third register, a second modulo-2 adder means for adding the 1 bit output of the first code converter means to the contents of the third register, the third register storing the output of the second adder means, a fourth register for storing the output of the second adder means, a fifth register for storing plaintext information input through the input terminal, a third modulo-2 adder means for adding the contents of the fourth register to the contents of the fifth register to produce ciphertext information, a sixth register for storing the output of the third adder, a first feedback means for feeding back the contents of the sixth register to the first shift register, a first output means for outputting the contents of the sixth register as ciphertext information, and a first control signal generator means for generating control signals to control operation of various elements of the encipherment section, the decipherment section comprising:

a second shift register storing latest k bits of ciphertext information, a seventh register storing k bits of cipher key, a fourth modulo-2 adder means for adding, bit by bit, the k-bit contents of the second shift register and the k-bit contents of the seventh register, a second expander means for expanding the k-bit output of the fourth modulo-2 adder means into $m \times n$ bits, an eighth register for storing the $m \times n$-bit outputs of the second expander means, a second controller means for performing control to extract the contents of the eighth register in sequence, a set of n bits at a time, a second code converter means receiving the output of the eighth register as extracted in turn by the second controller means, and converting each set of n bits into a single bit, a ninth register, a fifth modulo-2 adder means for adding the 1 bit output of the second code converter means to the contents of the ninth register, the ninth register storing the output of the fifth adder means, a tenth register for storing the output of the fifth adder means, an eleventh register for storing ciphertext information input through the input terminal, a sixth modulo-2 adder means for adding the contents of the tenth register to the contents of the eleventh register to produce deciphertext information, a twelfth register for storing the output of the sixth adder, a second feedback means for feeding back the contents of the eleventh register to the second shift register;

a second output means for outputting the contents of the twelfth register as deciphered text information, and a second control signal generator means for generating control signals to control operation of various elements of the decipherment section, where k, m and n are integers satisfying $m \times n > k$.

BRIEF DESCRIPTION OF THE DRAWINGS

FIG. 6 is a diagram showing an example of truth table explaining the operation of the code converter.

DETAILED DESCRIPTION OF THE EMBODIMENTS

An embodiment of the invention will now be described with reference to the drawings.

Figure 1:
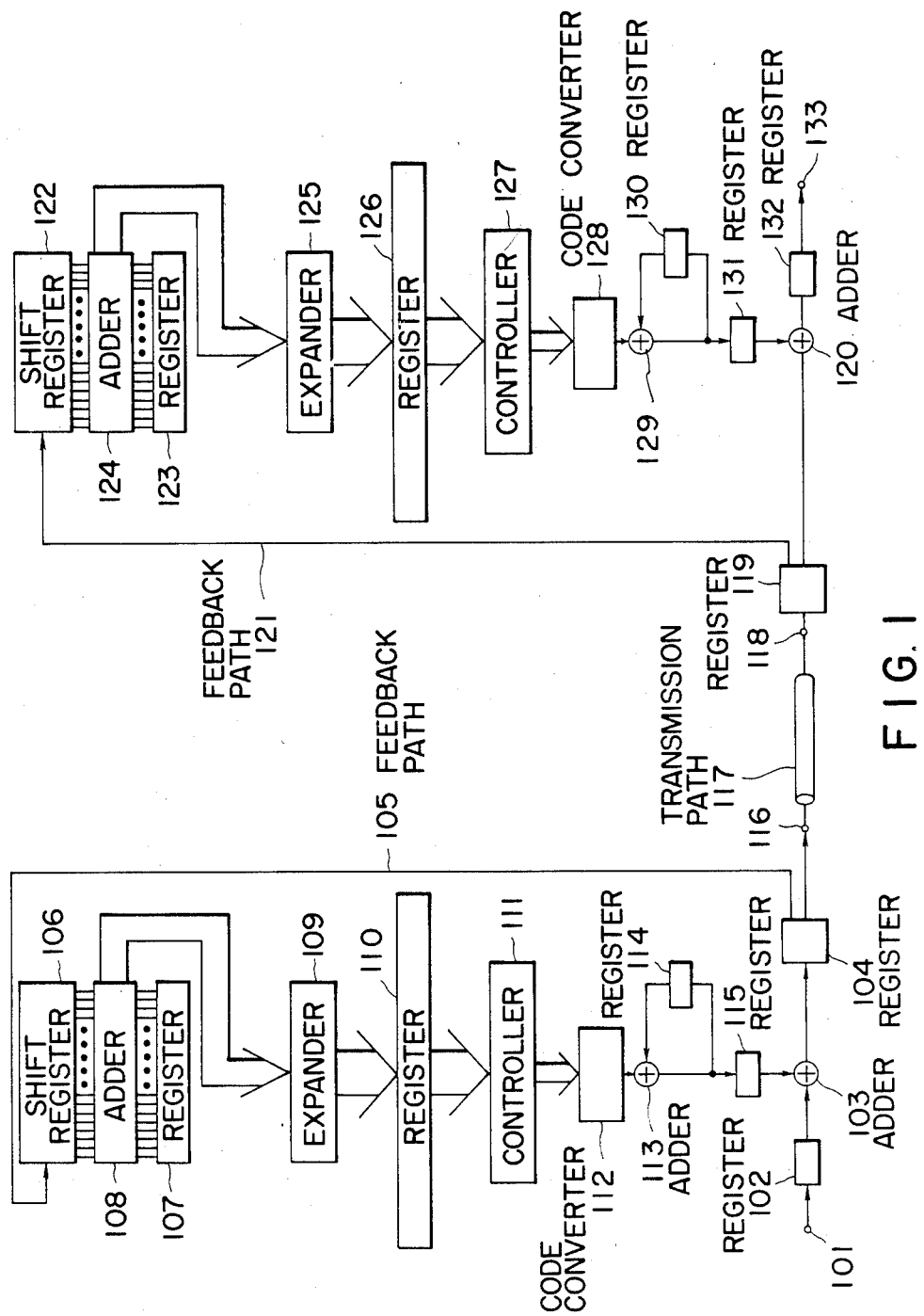
FIG. 1 is a block diagram showing a configuration of an embodiment of the invention.

FIG. 1 is a block diagram showing a construction of an embodiment of the invention. The left side of FIG. 1 is an encipherment section comprising an input terminal 101 for inputting plaintext information, a register 102 for storing the plaintext input through the input terminal 101, a modulo-2 adder 103 adding one bit of the plaintext stored in the register 102 and one bit stored in a register 115 storing one-bit output of a modulo-2 adder 113, a register 104 storing the output of the adder 103, a feedback path 105 for feeding back the output of the adder 103 that is stored in the register 104 to a shift register 106 whose length is k bits, a modulo-2 adder 108 for adding the bits of the contents of the shift register 106 to the respective bits of the contents of the register 107, an expander 109 for expanding the k-bit output of the modulo-2 adder 108 into $m \times n$ bit data, a register 110 for storing the output of the expander 109, a controller for controlling the contents of the register 110 to be input, n bit at a time, to a code converter 112 which converts each set of n bits into a single bit, a modulo-2 adder 113 for adding the output of the code converter 112 and the output of the register 114, which stores the 1-bit output of the adder 113, a register 115 for storing the output of the adder 113, an output terminal 116 for outputting the contents of the register 104 as ciphertext, and a control signal generator (not shown) for generating, responsive to a master clock and a transmission clock, a control signal by which input the contents of the register 110 are sequentially input, n bits at a time, into the code converter 112, a RESET signal for the register 114, a WRITE signal for the register 114, a WRITE signal for the register 115, a WRITE signal for the register 104, and the like.

Denoted by numeral 117 is a signal transmission path or line.

The right side of FIG. 1 is a decipherment section, which comprises an input terminal 118 for inputting ciphertext information from the encipherment section, a register 119 for storing the ciphertext input through the input terminal 118, a modulo-2 adder 120 for adding the single bit ciphertext information stored in the register 119 to the output of the adder 129 stored in the register 131, a feedback path 121 for feeding back the ciphertext to a shift register 122 having a k-bit length, a register 123 storing a k-bit decipher key, a modulo-2 adder 124 for adding bit by bit the contents of the shift register 122 to the contents of the register 123, an expander 125 for expanding the k-bit output of the adder 124 into $m \times n$ bits, a register 126 for storing the output of the expander 125, a controller 127 for performing control to input the contents of the register 126 n bits at a time, into a code converter 128, which converts each set of n bits output from the controller 127, into single bit data, a modulo-2 adder 129 adding the output of the code converter 128 and the output of a register 130 which stores the 1-bit output of the adder 129, another register 131 which stores the 1-bit output of the adder 129, a register 132 which stores the output of the adder 120, an output terminal 133 for outputting the contents of the register 132 as a deciphered information, and a control signal generator, not shown, that receives a master clock and a transmitted clock and produces a control signal for controlling the contents of the register 126 to be input into the code converter 128, in sequence, n bits at a time, a RESET signal for the register 130, a WRITE signal for the register 130, a WRITE signal for the register 131, a WRITE signal for the register 132, and the like. In the above description k, m, and n are arbitrary integers that satisfy $m \times n \geq k$.

Figure 2:
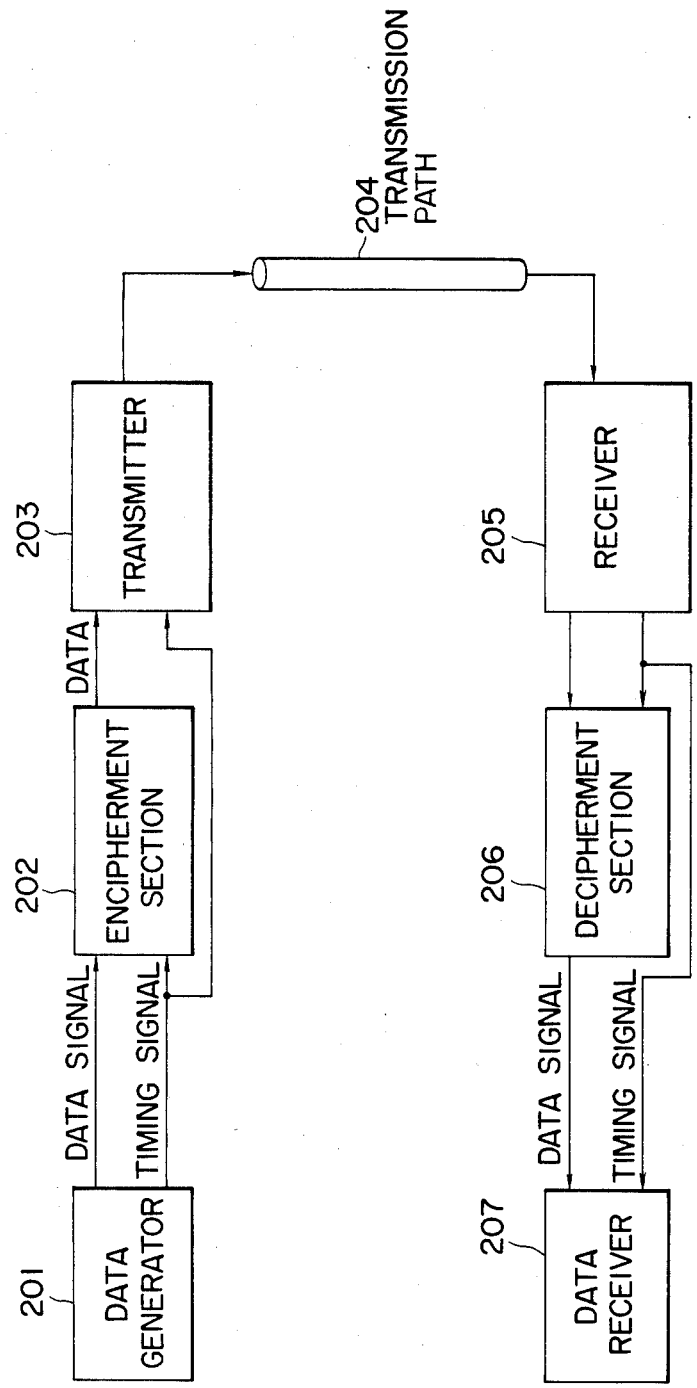
FIG. 2 is a block diagram showing an environment in which the encipherment section and the decipherment section are used.
Figure 3:
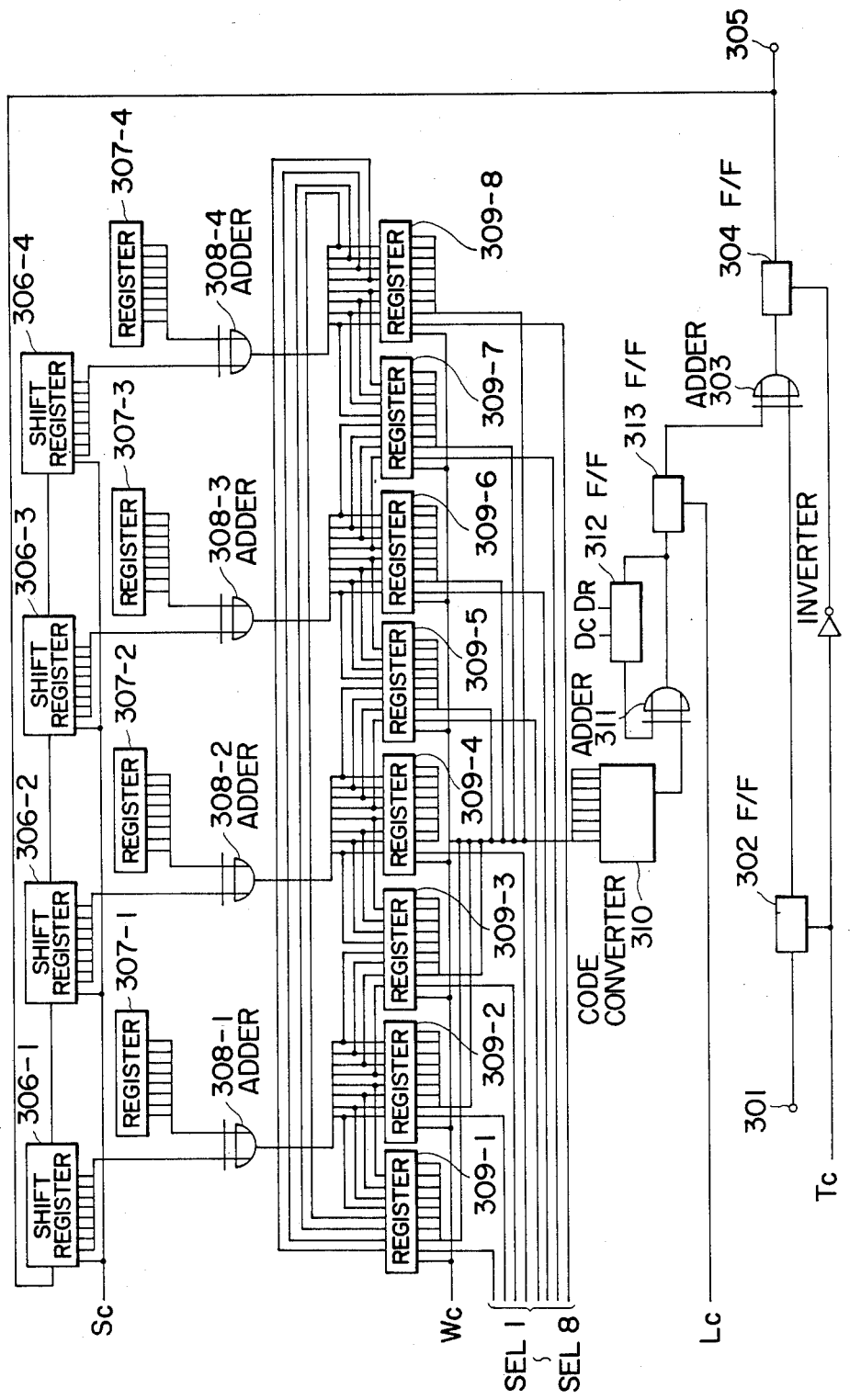
FIG. 3 is a circuit diagram showing a configuration of an encipherment unit.
Figure 4:
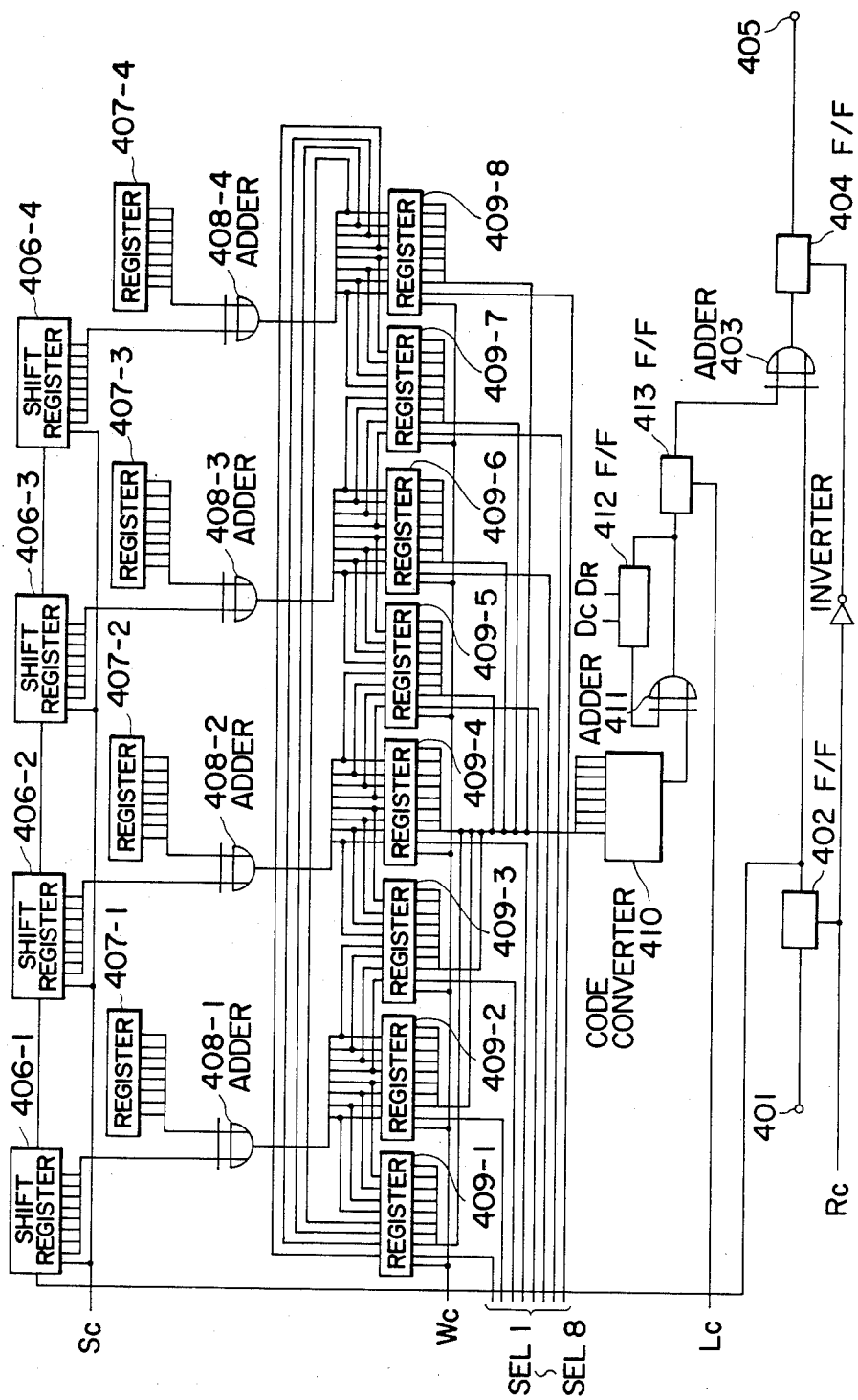
FIG. 4 is a circuit diagram showing a configuration of a decipherment unit.

FIG. 2 is a block diagram showing the environment of the apparatus of the above embodiment. FIG. 3 and FIG. 4 are circuit diagrams showing the encipherment section 202 and the decipherment section 206 of the embodiment of FIG. 2. In FIGS. 3 and 4, it is assumed that k=32, m=8, n=8. The invention does not limit k, m and n to be the above values.

In FIG. 2, data signal generated from the data generator 201 and a timing signal indicating the READ timing of the data signal are supplied to the encipherment section 202. At the encipherment section 202, the data being supplied is enciphered and the timing signal is sent to the transmitter 203. The transmitter 203 converts the data into a form of signal suitable for transmission via the transmission path, and transmits the converted data over the transmission path.

The receiver 205 receives the signal from the transmission path 204 and extracts, from the received signal, the data signal and the timing signal and sends them to the decipherment section 206. The decipherment section 206 deciphers the data and sends the deciphered data to the data receiver 207. In a conventional data transmission in which the transmitted information is not enciphered, a data signal line for transmission of data, and a timing signal line for synchronizing the transmission of data signal are required. According to the embodiment of the invention, signals that must be required from the outside are these two signals: the data signal and the timing signal, and no other signals are required.

Figure 5:
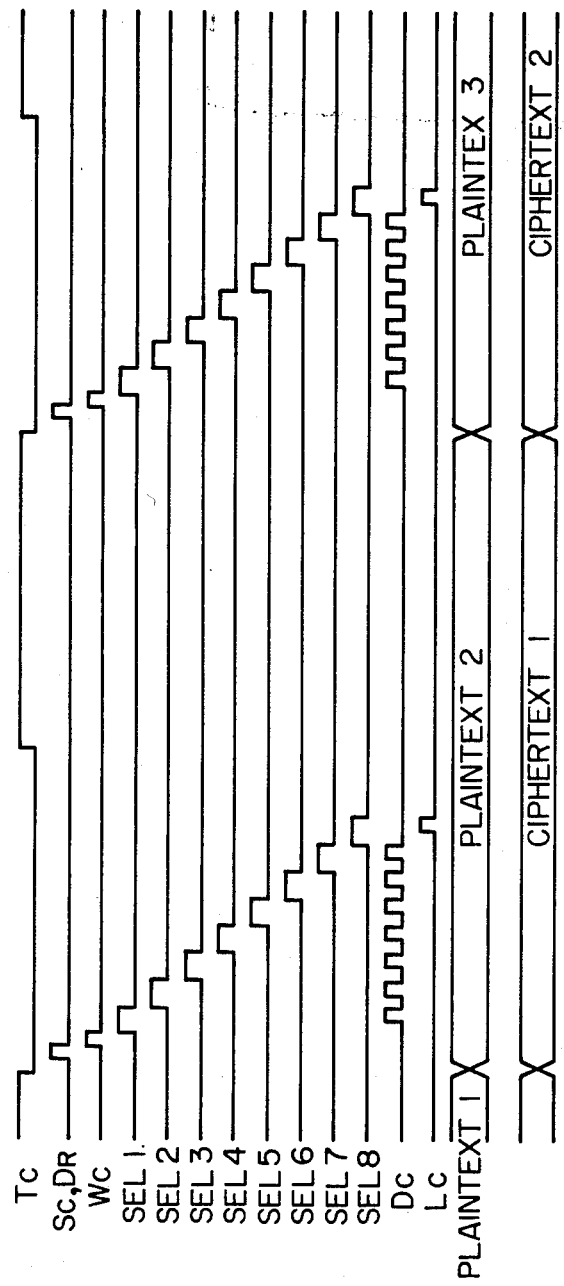
FIG. 5 is a timing chart showing data signals and control signals

The encipherment section will be described in details with reference to FIG. 3. FIG. 5 shows the timings of the data signal and the control signals.

The timing signal Tc indicates the READ timing of the input data. Other control signals Sc, Dr, Wc, SEL1 to SEL8, Dc and Lc are generated by a controller, not shown, having logic circuit configured to generate the signals at timings shown in FIG. 5, using the timing signal Tc as a trigger and using the internal clock CLK. The control signal Sc generated by being triggered by the falling edge of the timing signal Tc shifts, by one bit to the right, the contents of the four shift registers 306-1 to 306-4. Simultaneously therewith, the data that have been held in the flip-flop 304 is shifted in the shift register 306-1. The control signal Dr is generated at the same timing as the control signal Sc, by which the flip-flop 312 is reset. Four registors 307-1 to 307-4 store encipherment keys and are called encipherment key registers. The encipherment keys are set in advance from the outside. Data from the shift register 306 (306-1 to 306-4) and data from the registers 307 (307-1 to 307-4) are added at modulo-2 adders 308 (308-1 to 308-4). The result of the addition are written in the registers 309 (309-1 to 309-8). The outputs of the adder 308 and the input of the register 309 are so connected that each bit of the result of the addition is supplied to two registers. The output of the registers 309 are three-state outputs. When one of the control signal SEL (SEL1 to SEL8) is high, the signal from the corresponding register is input into the code converter 310. As shown in FIG. 5, first the control signal SEL1 is made high, and the contents of the register 309-1 are input into the code converter 310. The code converter 310 is formed of a ROM (read-only-memory) or a random logic circuit. It outputs either "1" or "0". Its input consists of 8 bits and its output consists one bit. The value of the output, "1" or "0" is unequivocally defined against each of the $2^8 = 256$ values of the input. An example of the truth table showing the input-output relationship of the code converter 310 is shown in FIG. 6. The output of the code converter 310 is passed through the modulo-2 adder 311, since the flip-flop 312 is reset, and applied to the flip-flops 312 and 313 and held at the flip-flop 312 at the timing of the control signal Dc.

Next the control signal SEL2 is turned high and the contents of the register 309-2 are input into the code converter 310. The output of the code converter 310 is added at the modulo-2 adder 311 to the output of the flip-flop 312, and the result of the addition is held in the flip-flop 312 at the timing of the control signal Dc. Similar process is repeated responsive to the control signals SEL3 to SEL7.

When the last control signal SEL8 is turned high, the contents of the register 309-8 are input into the code converter 310, whose output is added at the adder 311 to the output of the flip-flop 312. The result of the addition is applied to the flip-flops 312 and 313 and is held in the flip-flop 313 at the timing of the control signal Lc.

The plaintext data input through the input terminal 301 is held in the flip-flop 302 at the rising edge of the timing signal Tc.

The outputs of the flip-flops 313 and 302 are added at the adder 303, and the sum is held at the falling edge of the timing signal Tc. The contents of the flip-flop 304 is output as a ciphertext through the output terminal 305.

The decipherment section will now be described with reference to FIG. 4.

As illustrated, it comprises an input terminal 401, a flip-flop 402, an adder 403, a flip-flop 404, an output terminal 405, shift registers 406-1 to 406-4, registers 407-1 to 407-4, adders 408-1 to 408-4, registers 409-1 to 409-8, a code converter 410, an adder 411, and flip-flops 412 and 413. The operation of the decipherment section is identical to the operation of the encipherment section except that: the information input through the input terminal is ciphertext, and the information output through the output terminal is a deciphered text, and the data fed back to the shift register is not the output of the flip-flop 404 corresponding to the flip-flop 304 of FIG. 3 but the output of the flip-flop 402 corresponding to the flip-flop 302 of FIG. 3.

In the above embodiment, the relationship between the plaintext Pt, and the ciphertext Ct and the deciphered text P't at time t can be expressed as follows: In the below expression $e_1, e_2, \ldots e_{32}$ and $d_1, \ldots d_{32}$ denote encipherment key and decipherment key, respectively, and F denotes the function of the code converters 118 and 128.

$C_t = P_t$ $\oplus F\ (e_{29} \oplus C_{t-29},\ e_{30} \oplus C_{t-30},\ e_{31} \oplus C_{t-31},\ e_{32} \oplus C_{t-32},\ e_1 \oplus C_{t-1},\ \ldots\ e_4 \oplus C_{t-4})$ $\oplus F\ (e_1 \oplus C_{t-1},\ e_2 \oplus C_{t-2},\ e_3 \oplus C_{t-3},\ e_4 \oplus C_{t-4},\ e_5 \oplus C_{t-5},\ \ldots\ e_8 \oplus C_{t-8})$ $\oplus F\ (e_5 \oplus C_{t-5},\ e_6 \oplus C_{t-6},\ e_7 \oplus C_{t-7},\ e_8 \oplus C_{t-8},\ e_9 \oplus C_{t-9},\ \ldots\ e_{12} \oplus C_{t-12})$ $\oplus F\ (e_9 \oplus C_{t-9},\ e_{10} \oplus C_{t-10},\ e_{11} \oplus C_{t-11},\ e_{12} \oplus C_{t-12},\ e_{13} \oplus C_{t-13},\ \ldots\ e_{16} \oplus C_{t-16})$ $\oplus F\ (e_{13} \oplus C_{t-13},\ e_{14} \oplus C_{t-14},\ e_{15} \oplus C_{t-15},\ e_{16} \oplus C_{t-16},\ e_{17} \oplus C_{t-17},\ \ldots\ e_{20} \oplus C_{t-20})$ $\oplus F\ (e_{17} \oplus C_{t-17},\ e_{18} \oplus C_{t-18},\ e_{19} \oplus C_{t-19},\ e_{20} \oplus C_{t-20},\ e_{21} \oplus C_{t-21},\ \ldots\ e_{24} \oplus C_{t-24})$ $\oplus F\ (e_{21} \oplus C_{t-21},\ e_{t-22} \oplus C_{t-22},\ e_{23} \oplus C_{t-23},\ e_{24} \oplus C_{t-24},\ e_{25} \oplus C_{t-25},\ \ldots\ e_{28} \oplus C_{t-28})$ $\oplus F\ (e_{25} \oplus C_{t-25},\ e_{26} \oplus C_{t-26},\ e_{27} \oplus C_{t-27},\ e_{28} \oplus C_{t-28},\ e_{29} \oplus C_{t-29},\ \ldots\ e_{32} \oplus C_{t-32})$ $P'_t = C_t$ $\oplus F\ (d_{29} \oplus C_{t-29},\ d_{30} \oplus C_{t-30},\ d_{31} \oplus C_{t-31},\ d_{32} \oplus C_{1-32},\ d_1 \oplus C_{t-1},\ \ldots\ d_4 \oplus C_{t-4})$ $\oplus F\ (d_1 \oplus C_{t-1},\ d_2 \oplus C_{t-2},\ d_3 \oplus C_{t-3},\ d_4 \oplus C_{t-4},\ d_5 \oplus C_{t-5},\ \ldots\ d_8 \oplus C_{t-8})$ $\oplus F\ (d_5 \oplus C_{t-5},\ d_6 \oplus C_{t-6},\ d_7 \oplus C_{t-7},\ d_8 \oplus C_{t-8},\ d_9 \oplus C_{t-9},\ \ldots\ d_{12} \oplus C_{t-12})$ $\oplus F\ (d_9 \oplus C_{t-9},\ d_{10} \oplus C_{t-10},\ d_{11} \oplus C_{t-11},\ d_{12} \oplus C_{t-12},\ d_{13} \oplus C_{t-13},\ \ldots\ d_{16} \oplus C_{t-16})$ $\oplus F\ (d_{13} \oplus C_{t-13},\ d_{14} \oplus C_{t-14},\ d_{15} \oplus C_{t-15},\ d_{16} \oplus C_{t-16},\ d_{17} \oplus C_{t-17},\ \ldots\ d_{20} \oplus C_{t-20})$ $\oplus F\ (d_{17} \oplus C_{t-17},\ d_{18} \oplus C_{t-18},\ d_{19} \oplus C_{t-19},\ d_{20} \oplus C_{t-20},\ d_{21} \oplus C_{t-21},\ \ldots\ d_{24} \oplus C_{t-24})$ $\oplus F\ (d_{21} \oplus C_{t-21},\ d_{22} \oplus C_{22},\ d_{23} \oplus C_{t-23},\ d_{24} \oplus C_{t-24},\ d_{25} \oplus C_{t-25},\ \ldots\ d_{28} \oplus C_{t-28})$ $\oplus F\ (d_{25} \oplus C_{t-25},\ d_{26} \oplus C_{t-26},\ d_{27} \oplus C_{t-27},\ d_{28} \oplus C_{t-28},\ d_{29} \oplus C_{t-29},\ \ldots\ d_{32} \oplus C_{t-32})$ Each terminal of the cipher system can comprises an encipherment section and a decipherment section as shown in FIG. 3 and FIG. 4. But as many of the circuit elements and the interconnection of the encipherment section are identical to those of the decipherment section, and they are not used for the two-purposes simultaneously, they can be shared by the encipherment and the decipherment if suitable reconnection arrangement is made.

Figure 7:
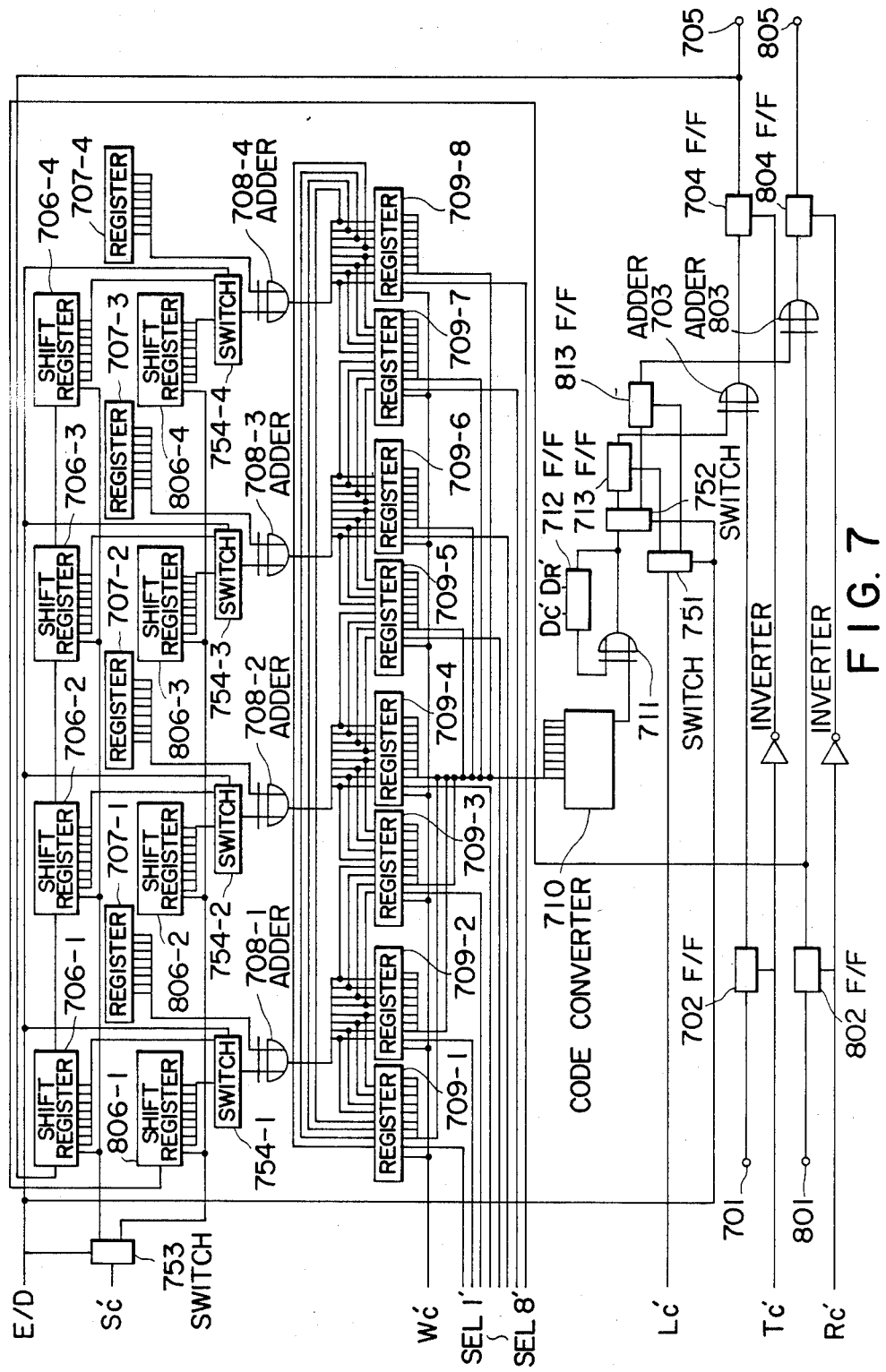
FIG. 7 is a block diagram showing a second embodiment of the invention.
Figure 8:
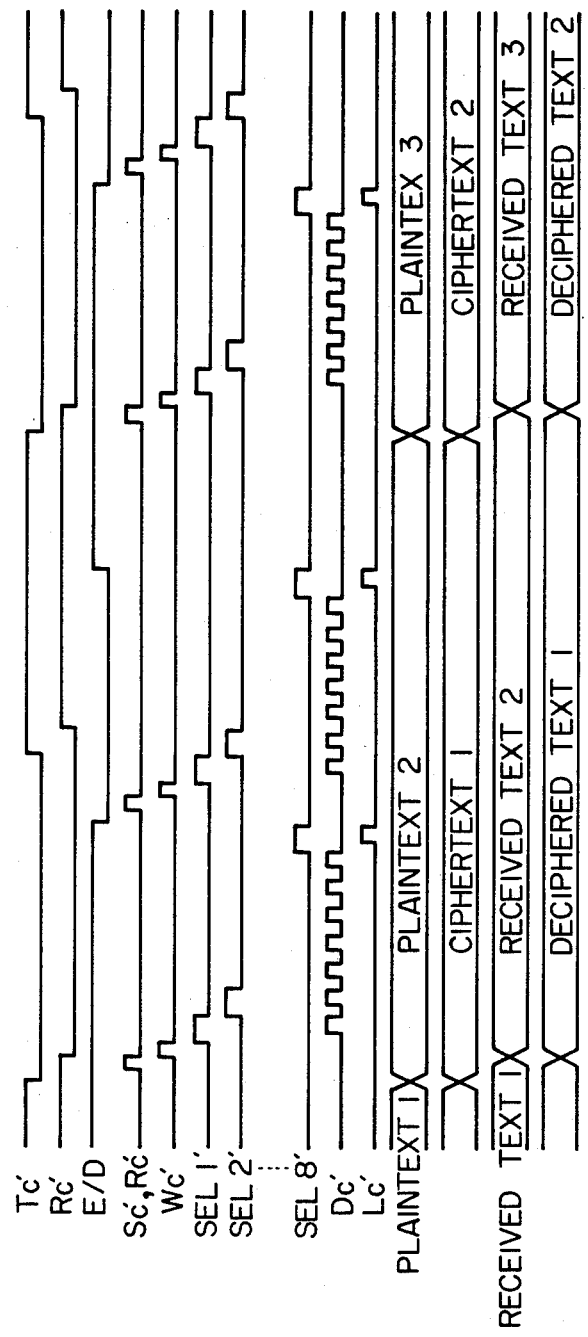
FIG. 8 is a timing chart showing data signals and control signals.
Figure 9:
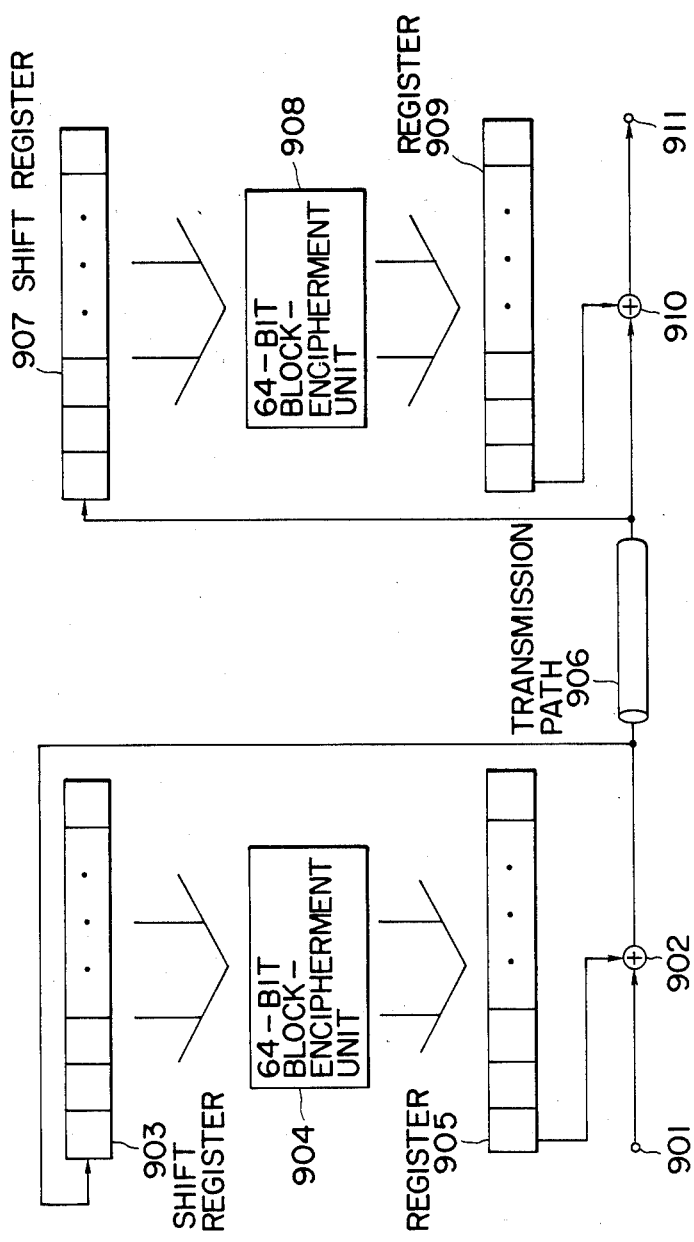
FIG. 9 and FIG. 10 are block diagrams showing prior art cipher systems shown and described in the Literatures 2 and 1, respectively.
Figure 10:
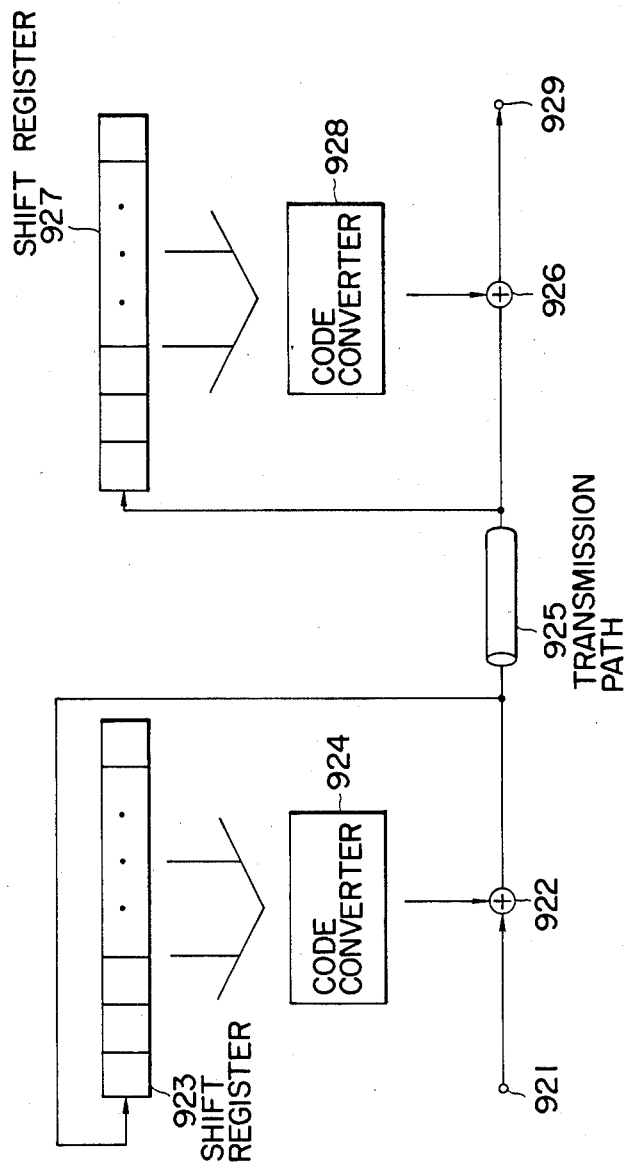

FIG. 7 shows an example of a terminal having such an arrangement. As shown it comprises an input terminal 701 for receiving a plaintext, a flip-flop 702, an input terminal 801 for receiving ciphertext, a flip-flop 802, adders 703, 803, flip-flops 704, 804, output terminals 705, 805, shift registers 706-1 to 706-4, 806-1 to 806-4, registers 707-1 to 707-4, adders 708-1 to 708-4, registers 709-1 to 709-8, a code converter 710, an adder 711, a flip-flop 712, flip-flops 713, 813, switches 751, 752, 753, and 754-1 to 754-4. Signals similar to those shown in FIGS. 3 and 4 are denoted by identical numerals with a prime ('). In the embodiment of FIG. 7, all circuit elements in the encipherment section and the decipherment section, except the shift registers, are shared. Part of their interconnections are altered by the switches for operation as an encipherment section or as a decipherment section. In other words, they are used in a time-sharing manner. Plaintext is input through the terminal 701 and ciphered and output through the terminal 705. The ciphertext that is received is input through the terminal 801 and the deciphered text is output through the terminal 805. The timings of various data and control signals are shown in FIG. 8. Switching between encipherment and decipherment is effected by means of a control signal E/D. The operation of the terminal connected for encipherment is identical to that described in connection with FIG. 3. The operation of the terminal connected for decipherment is identical to that described in connection with FIG. 4.

As has been described, according to the invention, the contents of the shift register is added to the contents of the register storing encipherment key or of the register storing the decipherment key, and the sum is applied to the code converter. Regardless of the number of keys, the code converter needs only one pattern. Moreover, data consisting of $k = m \times n$ can be divided into sets of n bits, and each set of n bits are input into the code converter. The number of patterns of the code converter need not be more than $2^n$. The size of the code converter can therefore be reduced or the capacity of ROM can be reduced. For instance the code converter formed of a ROM, and $m = 16$, $n = 8$, $k = 64$ the capacity of the ROM need only to be $2^8 = 256$ bits.

Moreover, the complicated divisional processing or the repeated process bit manipulation as in 64-bit block encipherment, DES for instance, need not be performed but minute variation in the encipherment/decipherment key or in the plaintext information can be enlarged in the ciphertext information or deciphered text information.

What is claimed is:

1. A cipher system comprising an encipherment section and a decipherment section, the encipherment section comprising:

a first shift register storing latest k bits of ciphertext information, a first register storing k bits of cipher key, a first modulo-2 adder means for adding, bit by bit, the k-bit contents of the first shift register and the k-bit contents of the first register, a first expander means for expanding the k-bit output of the first modulo-2 adder means into $m \times n$ bits, a second register for storing the $m \times n$-bit output of the first expander means, a first controller means for performing control to extract the contents of the second register in sequence, a set of n bits at a time, a first code converter means receiving the output of the second register as extracted in turn by the first controller means, and converting each set of n bits into a single bit, a third register, a second modulo-2 adder means for adding the 1 bit output of the first code converter means to the contents of the third register, the third register storing the output of the second adder means, a fourth register for storing the output of the second adder means, a fifth register for storing plaintext information input through the input terminal, a third modulo-2 adder means for adding the contents of the fourth register to the contents of the fifth register to produce ciphertext information, a sixth register for storing the output of the third adder, a first feedback means for feeding back the contents of the sixth register to the first shift register, a first output means for outputting the contents of the sixth register as ciphertext information, and a first control signal generator means for generating control signals to control operation of various elements of the encipherment section,
the decipherment section comprising:
a second shift register storing latest k bits of ciphertext information,
a seventh register storing k bits of cipher key,
a fourth modulo-2 adder means for adding, bit by bit, the k-bit contents of the second shift register and the k-bit contents of the seventh register,
a second expander means for expanding the k-bit output of the fourth modulo-2 adder means into $m \times n$ bits,
an eighth register for storing the $m \times n$-bit output of the second expander means,
a second controller means for performing control to extract the contents of the eighth register in sequence, a set of n bits at a time,
a second code converter means receiving the output of the eighth register as extracted in turn by the second controller means, and converting each set of n bits into a single bit,
a ninth register,
a fifth modulo-2 adder means for adding the 1 bit output of the second code converter means to the contents of the ninth register,
the ninth register storing the output of the fifth adder means,
a tenth register for storing the output of the fifth adder means,
an eleventh register for storing ciphertext information input through the input terminal,
a sixth modulo-2 adder means for adding the contents of the tenth register to the contents of the eleventh register to produce ciphertext information,
a twelfth register for storing the output of the sixth adder,
a second feedback means for feeding back the contents of the eleventh register to the second shift register,
a second output means for outputting the contents of the twelfth register as deciphered text information, and
a second control signal generator means for generating control signals to control operation of various elements of the encipherment section,
where k, m and n are integers satisfying $m \times n > k$.

2. A terminal for use in a cipher system, said terminal comprising an encipherment section and a decipherment section, said encipherment section comprising:
a first shift register storing latest k bits of ciphertext information,
a first register storing k bits of cipher key,
a first modulo-2 adder means for adding, bit by bit, the k-bit contents of the first shift register and the k-bit contents of the first register,
a first expander means for expanding the k-bit output of the first modulo-2 adder means into $m \times n$ bits,
a second register for storing the $m \times n$-bit output of the first expander means,
a first controller means for performing control to extract the contents of the second register in sequence, a set of n bits at a time,
a first code converter means receiving the output of the second register as extracted in turn by the first controller means, and converting each set of n bits into a single bit,
a third register,
a second modulo-2 adder means for adding the 1 bit output of the first code converter means to the contents of the third register,
the third register storing the output of the second adder means,
a fourth register for storing the output of the second adder means,
a fifth register for storing plaintext information input through the input terminal,
a third modulo-2 adder means for adding the contents of the fourth register to the contents of the fifth register to produce ciphertext information,
a sixth register for storing the output of the third adder,
a first feedback means for feeding back the contents of the sixth register to the first shift register,
a first output means for outputting the contents of the sixth register as ciphertext information, and
a first control signal generator means for generating control signals to control operation of various elements of the encipherment section,
said decipherment section comprising:
a second shift register storing latest k bits of ciphertext information,
a seventh register storing k bits of cipher key,
a fourth modulo-2 adder means for adding, bit by bit, the k-bit contents of the second shift register and the k-bit contents of the seventh register,
a second expander means for expanding the k-bit output of the fourth modulo-2 adder means into $m \times n$ bits,
an eighth register for storing the $m \times n$-bit output of the second expander means,
a second controller means for performing control to extract the contents of the eighth register in sequence, a set of n bits at a time,
a second code converter means receiving the output of the eighth register as extracted in turn by the second controller means, and converting each set of n bits into a single bit,
a ninth register,
a fifth modulo-2 adder means for adding the 1 bit output of the second code converter means to the contents of the ninth register,
the ninth register storing the output of the fifth adder means,
a tenth register for storing the output of the fifth adder means,
an eleventh register for storing ciphertext information input through the input terminal,
a sixth modulo-2 adder means for adding the contents of the tenth register to the contents of the eleventh register to produce ciphertext information,
a twelfth register for storing the output of the sixth adder,
a second feedback means for feeding back the contents of the eleventh register to the second shift register;
a second output means for outputting the contents of the twelfth register as deciphered text information, and
a second control signal generator means for generating control signals to control operation of various elements of the encipherment section,
where k, m and n are integers satisfying $m \times n > k$.

3. A terminal acording to claim 2, wherein said first register is also used as said seventh register, said first adder means is also used as said fourth adder means, said first expander means is also used as said second expander means, said second register is also used as said eighth register, said first controller means is also used as said second controller means, said first code converter means is also used as said second code converter means, said second adder means is also used as said fifth adder means, said third register is also used as said ninth register the encipherment section and the decipherment section using the above elements in a time-sharing manner.

4. A terminal according to claim 3 further comprising switching means for selective connection of the elements shared by the encipherment section and the decipherment section, either for operation for encipherment or for decipherment.

* * * * *